(12) United States Patent
Nichols (10) Patent No.: US 12,254,708 B2
(45) Date of Patent: Mar. 18, 2025

(54) OBJECT DETECTION MODEL TRAINING

(71) Applicant: Christian Amari Nichols, Brockton, MA (US)

(72) Inventor: Christian Amari Nichols, Brockton, MA (US)

(*) Notice: Subject to any disclaimer, the term of this patent is extended or adjusted under 35 U.S.C. 154(b) by 449 days.

(21) Appl. No.: 17/685,612

(22) Filed: Mar. 3, 2022

(65) Prior Publication Data
US 2023/0282007 A1    Sep. 7, 2023

(51) Int. Cl.
*G06V 20/64* (2022.01)
*G06N 3/08* (2023.01)
*G06V 20/50* (2022.01)

(52) U.S. Cl.
CPC ............... *G06V 20/64* (2022.01); *G06N 3/08* (2013.01); *G06V 20/50* (2022.01)

(58) Field of Classification Search
CPC ...... G06V 20/64; G06V 20/50; G06V 10/774; G06V 10/56; G06V 10/764; G06V 10/82; G06N 3/08; G06N 20/00; G06N 3/0464
See application file for complete search history.

(56) References Cited

U.S. PATENT DOCUMENTS

2018/0330166 A1* 11/2018 Redden ............... G06T 7/75
2021/0365745 A1* 11/2021 Browning ........... G06V 10/809

OTHER PUBLICATIONS

Anemone et al., "Finding Fossils in New Ways: An Artificial Neural Network Approach to Predicting the Location of Productive Fossil Localities," Evolutionary Anthropology, 2011, 20:169-180.
Choi [online], "Artificial Intelligence Helps Spot Fossil Sites," Live Science, Nov. 28, 2011, retrieved from URL <https://www.livescience.com/17203-artificial-intelligence-fossils.html>, 14 pages.
Coelho et al., "Unsupervised learning of satellite images enhances discovery of late Miocene fossil sites in the Urema Rift, Gorongosa, Mozambique," PeerJ, Jun. 8, 2021, 24 pages.
Fathi et al. [online], "3D Scene Understanding with TensorFlow 3D," Google AI Blog, Feb. 11, 2021, retrieved from URL <https://ai.googleblog.com/2021/02/3d-scene-understanding-with-tensorflow.html>, 5 pages.

(Continued)

*Primary Examiner* — Samir A Ahmed
(74) *Attorney, Agent, or Firm* — Fish & Richardson P.C.

(57) ABSTRACT

Methods, systems, and apparatus, including computer programs encoded on computer storage media, for training a model to detect objects. One of the methods includes maintaining first training data that represents at least a plurality of first images of invertebrate fossils; determining, using at least one or more geographic properties of a geographic region, one or more transformations from a group comprising: a pixel group translation, a pixel group two-dimensional rotation, a changed background, or an object obfuscation; creating, using the one or more transformations and the first training data, second training data that represents at least a plurality of second images of invertebrate fossils; training, using the second training data, a machine learning model to detect invertebrate fossils in images of the geographic region; and providing, to a system, the trained machine learning model to enable the system to detect invertebrate fossils in images of the geographic region.

20 Claims, 3 Drawing Sheets

(56) References Cited

OTHER PUBLICATIONS

Hao et al. [online], "Training a single AI model can emit as much carbon as five cars in their lifetimes," MIT Technology Review, Jun. 6, 2019, retrieved from URL <https://www.technologyreview.com/2019/06/06/239031/training-a-single-ai-model-can-emit-as-much-carbon-as-five-cars-in-their-lifetimes/>, 9 pages.

Heaven, "Why deep-learning AIs are so easy to fool," Nature, Oct. 9, 2019, 574(7777):163-166, 14 pages.

Hecht [online], "Artificial intelligence joins the fossil hunt," New Scientist, Nov. 2, 2011, retrieved from URL <https://www.newscientist.com/article/mg21228376-000-artificial-intelligence-joins-the-fossil-hunt/#:~:text=THE%20traditional%20image%20of%20the%20fossil-hunting%20palaeontologist%20%E2%80%93,could%20greatly%20increase%20the%20number%20of%20fossils%20unearthed.>, 3 pages.

Itaki et al., "Automated collection of single species of microfossils using a deep learning-micromanipulator system," Progress in Earth and Planetary Science, 2020, 7:19, 7 pages.

Itaki et al., "Innovative microfossil (radiolarian) analysis using a system for automated image collection and AI-based classification of species," Scientific Reports, 2010, 10:21136, 9 pages.

Maxwell [online], "Finding Fossils with Remote Sensing," GIS Lounge, Nov. 4, 2014, retrieved from URL <https://www.gislounge.com/finding-fossils-remote-sensing/>, 9 pages.

Monteith [online], "Dinosaur Tracks & AI Technology—Visiting The Nash Dino Quarry in MA," Youtube, Nov. 2, 2021, retrieved on Mar. 7, 2022, retrieved from URL <https://www.youtube.com/watch?v=3BTguo6oaFo>, 1 page [Video Submission].

Monteith [online], "Using A.I. to Find Fossils & Why This is Important!" Medium, May 7, 2021, retrieved from URL <https://medium.com/@barnasblog/using-a-i-to-find-fossils-why-this-is-important-7828b840e003>, 17 pages.

Shen et al., "Deep Learning in Medical Image Analysis," Annu Rev Biomed Eng., Jun. 21, 2017, 19:221-248, 35 pages.

Shorten et al., "A survey on Image Data Augmentation for Deep Learning," J Big Data, 2019, 6:60, 48 pages.

Tao et al., "Artificial Intelligence Identification of Multiple Microfossils from the Cambrian Kuanchuanpu Formation in Southern Shaanxi, China," Acta Geologica Sinica (English Edition) 2020, 94(1):189-197.

Von Wangenheim [online], "Artificial Intelligence & Paleontology: Use Deep Learning to search for Microfossils," Towards Data Science, Jun. 7, 2019, retrieved from <https://towardsdatascience.com/artificial-intelligence-paleontology-use-deep-learning-to-search-for-microfossils-18760bb30880>, 21 pages.

[online], "Machine Learning," Geeks for Geeks, Dec. 3, 2021, retrieved from URL <https://www.geeksforgeeks.org/machine-learning/>, 9 pages.

[online], "Residual Networks (ResNet)—Deep Learning," Geeks for Geeks, Jan. 27, 2022, retrieved from URL <https://www.geeksforgeeks.org/residual-networks-resnet-deep-learning/>, 17 pages.

[online], "What is Artificial Intelligence? How does AI Work?" Built In, available on or before Mar. 11, 2019, retrieved from URL <https://builtin.com/artificial-intelligence>, 41 pages.

\* cited by examiner

OBJECT DETECTION MODEL TRAINING

BACKGROUND

Systems can use machine learning models to detect objects depicted in images. For instance, a system can use a machine learning model trained to detect a particular type of animal to determine whether an image captured by a camera depicts the particular type of animal.

SUMMARY

In general, one aspect of the subject matter described in this specification can be embodied in methods that include the actions of maintaining, for a machine learning model that will be trained to detect invertebrate fossils depicted in images of a geographic region, first training data that represents at least a plurality of first images of invertebrate fossils; determining, using at least one or more geographic properties of the geographic region, one or more transformations from a group comprising: a pixel group translation, a pixel group two-dimensional rotation, a changed background, or an object obfuscation; creating, using the one or more transformations and the first training data, second training data that represents at least a plurality of second images of invertebrate fossils by applying, to data from the first training data for a first image from the plurality of first images, the one or more transformations from the group comprising: a pixel group translation, a pixel group two-dimensional rotation, a changed background, or an object obfuscation; training, using the second training data, the machine learning model to detect invertebrate fossils in images of the geographic region; and providing, to a system, the trained machine learning model to enable the system to detect invertebrate fossils in images of the geographic region.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, determining the one or more transformations can include: determining, using the one or more geographic properties of the geographic region, one or more objects whose occurrence in the geographic region satisfies an occurrence threshold; and determining, using data for the one or more objects whose occurrence in the geographic region satisfies the occurrence threshold, at least one object obfuscation. Creating the second training data can include creating the second training data that represents at least one second image in which one of the one or more objects partially obfuscates an invertebrate fossil.

In some implementations, determining the one or more transformations can include determining, using a color range for the geographic region, the one or more transformations. Determining the one or more transformations can include determining, using the color range for the geographic region, one or more properties for a changed background transformation. Determining the one or more properties for the changed background transformation can include selecting data that represents an image of the geographic region. The image of the geographic region does not depict an invertebrate fossil. Creating the second training data can include creating the second training data that represents at least one second image in which an invertebrate fossil can be transposed onto the image of the geographic region. Determining, for each of a plurality of colors in the color range, a frequency with which the respective color occurs in one or more images of the geographic region. The second training data can represent a first quantity of second images; and creating the second training data can include creating, using the one or more transformations and the first training data, the second training data that includes, for each color in the plurality of colors, a respective second quantity of the second images, a ratio of the respective second quantity to the first quantity being approximately the same as the frequency with which the respective color occurs in the one or more images of the geographic region.

In some implementations, determining the one or more transformations can include determining one or more of a changed background, or an object obfuscation; and creating the second training data can include creating the second training data that represents second images of invertebrate fossils by applying, to data from the first training data for a first image from the plurality of first images, the one or more of a changed background, or an object obfuscation. Determining, for one or more images from the plurality of first images represented by the first training data, a bounding box that surrounds an object depicted in the image. Creating the second training data can include creating, using the one or more transformations and a subset of the first training data that represents respective portions of the images included in the bounding boxes, the second training data that represents a second image of the object.

In some implementations, training the machine learning model can include training, using the second training data, a convolutional neural network to detect invertebrate fossils depicted in images of the geographic region. Training the machine learning model can include training, using the second training data, a residual neural network to detect invertebrate fossils depicted in images of the geographic region. Maintaining the first training data can include maintaining, for the machine learning model that will be trained to detect invertebrate fossils depicted in images of the geographic region using aerial images, the first training data that represents at least the plurality of first images of invertebrate fossils; and providing, to the system, the machine learning model to enable the system to detect invertebrate fossils in images of the geographic region using aerial images. The first training data represents a) the plurality of first images of invertebrate fossils and b) a plurality of third images of negative objects that are not invertebrate fossils; and the second training data represents i) the plurality of second images of invertebrate fossils and ii) a plurality of fourth images of negative objects that are not invertebrate fossils.

In some implementations, the method can include, for a second, different geographic region that has at least one second geographic property that can be different than the one or more geographic properties of the geographic region: determining, using one or more second geographic properties of the second, different geographic region, one or more second transformations; creating, using the one or more second transformations and the first training data, third training data that represents third images; creating a second trained machine learning model by training, using the third training data, the machine learning model to detect invertebrate fossils depicted in second images of the second, different geographic region; and providing, to another system, the second trained machine learning model to enable the other system to detect invertebrate fossils depicted in second images of the second, different geographic region. The third images depict invertebrate fossils.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. In some implementations, training a machine learning model with input data transformed using runtime image properties, e.g., geographic properties of a geographic region in which the runtime images will be captured or properties of objects depicted in images of the geographic region or both, can improve an accuracy of the machine learning model detecting objects in images.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some systems can use machine learning models to detect objects depicted in images of a geographic region. However, different geographic regions can have different properties, making it difficult for a machine learning model trained for one geographic region to maintain a high accuracy detecting objects, e.g., invertebrate fossils, in another geographic region. For instance, the types of objects, e.g., trees and rocks, in the two regions can be different. Some other examples of different properties can include different colors, different frequencies with which the different colors appear in the geographic region, or both. Because of the different colors in the different geographic regions, objects within the different geographic regions can also have different colors. For example, animals or fossils can have colors that correspond to the colors of the geographic region.

To improve an accuracy of a machine learning model that detects objects depicted in images of the geographic region, a training system can transform training data using properties of the runtime images that will be captured in the geographic region. The properties can include geographic properties of the geographic region. The properties can include data for the colors of the geographic region, e.g., a color range for the geographic region. The colors can be geographic colors or any other appropriate colors for the geographic region. In some examples, the properties can relate to objects commonly found, e.g., at least a threshold amount, in the geographic region, background content commonly depicted, e.g., at least a second threshold amount, in images of the geographic region, or both.

In particular, the machine learning model can be used to detect fossils, e.g., invertebrate fossils, depicted in images of a geographic region. For instance, paleontologists can spend months in harsh conditions, especially after erosion incidents, attempting to find fossils on their field expeditions. A paleontologist can use a system, e.g., a drone with a camera, that includes the machine learning model trained with transformed or otherwise augmented training data to detect areas within a geographic region that are likely to include fossils, saving time and resources detecting fossils. The resources can be computational resources saved compared to other systems that do not train a machine learning model using properties of the geographic region.

Figure 1:
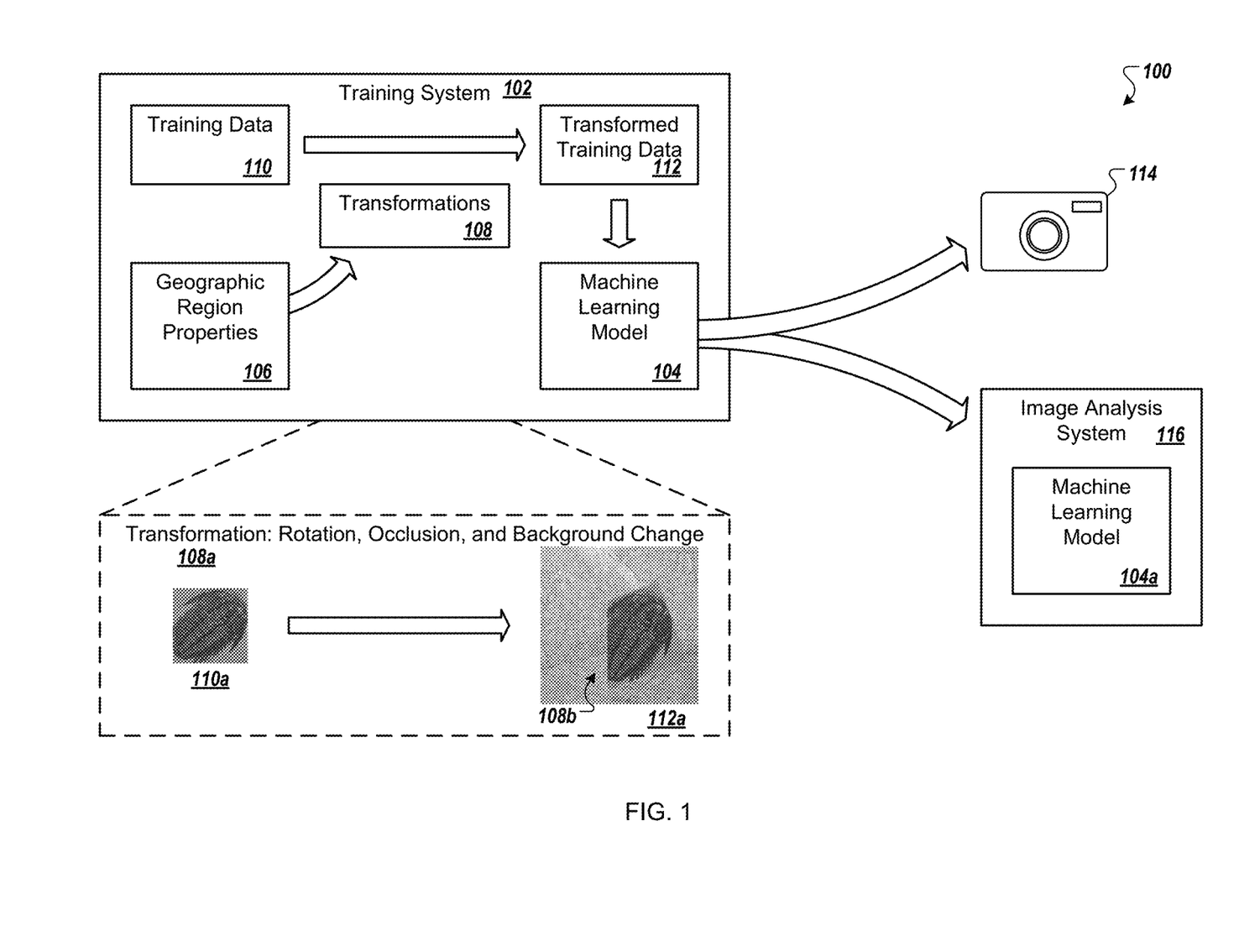
FIG. 1 depicts an example environment of a training system with a machine learning model.

FIG. 1 depicts an example environment 100 of a training system 102 with a machine learning model 104. The training system 102 can train the machine learning model using one or more transformations 108, such as transformations 108 determined using a geographic region's properties 106. The training system 102 can use the transformations 108, e.g., some of which are determined using the geographic region's properties 106, to train the machine learning model 104 using training data 110 that is not specific to the geographic region. This can enable the training system 102 to create multiple different geographic-region specific machine learning models 104 using the same training data 110 and different properties 106 for the different geographic regions, a trained machine learning model 104 that is more accurate for the geographic region for which it was trained, or both.

Although the examples in this specification describe properties of a geographic region in which runtime images will be captured, the systems and methods described in this specification can apply to other types of properties. For instance, the training system 102 can determine properties 106 for the runtime images that will be analyzed by the machine learning model 104 after training, when those properties are not necessarily for, e.g., specific to, the geographic region.

The training system 102 maintains, in memory, the geographic region's properties 106. The properties 106 can include data indicating one or more objects that each have an occurrence in the geographic region that satisfies an occurrence threshold. The properties 106 can include data indicating one or more colors for the geographic region, e.g., a color range. The properties 106 can include data indicating one or more elevations, one or more humidity levels, one or more temperatures, one or more precipitation levels, one or more light levels, one or more contrasts, one or more sunlight incidence angles, or a combination of two or more of these.

In some examples, when the properties 106 include more than one value of any particular type, the properties 106 can include timing information for at least some of the values of a particular type. For instance, when the properties 106 include two humidity levels or two sunlight incidence angles, the properties 106 can include a first value for the morning and a second value for the evening. When the properties 106 include data for two or more objects, the properties 106 can include a first value for an occurrence of a first object, a second value for an occurrence of a second object, and, if necessary, additional values for any additional objects in the two or more objects. The values can indicate, for a respective object, a frequency with which the object occurs in the geographic region.

The training system 102 can use the geographic region's properties 106, or other data, to determine one or more transformations 108 to apply to the training data 110. The transformations 108 can be any appropriate type of transformation. For instance, the transformations 108 can include changing a color of an object represented by data in the training data. The other data can include data used to randomly generate one or more transformations, such as a translation or a rotation, e.g., a random number generator seed.

The transformations 108 can include, as described in more detail below, a pixel group translation, e.g., horizontally, vertically, or both; a pixel group two-dimensional rotation, e.g., around a central axis; a changed background; a changed size, e.g., as defined by a number of pixels; an object obfuscation; or a combination of two or more of these. Changing an object obfuscation can include the training system 102 changing an amount to which an object is occluded, or blocked, by other objects depicted in an image, e.g., so that less of the object is depicted in the image. The object can be a positive example of an object for which the machine learning model 104 is being trained to detect. The object can be a negative example of an object for which the machine learning model 104 is not being trained to detect. The other objects can be any appropriate types of objects, e.g., a negative example when the object is a positive example, a negative example when the object is a negative example, a positive example when the object is a negative example, or background content when the object is either a positive example or a negative example. In some implementations, an object can be occluded with multiple other objects, e.g., both a negative example and background content or both a positive example and background content.

A changed background can include changing the color of, objects depicted in, or both, background content depicted in an image, e.g., that also depicts an object for which the machine learning model 104 is being trained to detect. For instance, the training system 102 can transpose an object from one background, represented by the training data 110, to another background as part of a background change transformation. The training system 102 can change the color of background content depicted in an image represented by the training data 110.

The training data 110 can be any appropriate type of training data. For instance, the training data 110 can include images or data representing images. The data representing images can include vectors, e.g., such that each vector represents a corresponding image.

The training system 102 can apply the transformations 108 to the training data 110 to create transformed training data 112. The transformed training data 112 can have a second size that is larger than a first size of the training data 110. For instance, when the training data 110 represents a first number of images, the transformed training data 112 can represent a second, different number of images which second, different number is larger than the first number. By creating the transformed training data 112, the training system 102 can create a more robust training set than would be otherwise available, a training set that is specific to the geographic region, or both. Use of the transformed training data 112 can enable a trained version of the machine learning model 104 to be more accurate than it might otherwise be.

In some examples, the transformations 108 can include applying multiple different transformations to a set of the training data 110 to create a corresponding set of the transformed training data 112. For instance, the transformation 108a, shown in the environment 100, includes a two-dimensional rotation, an occlusion, and a background change applied to first training data 110a to create the first transformed training data 112a. In this example, the first training data 110a depicts an image of a trilobite fossil. The training system 102 can apply a rotation, e.g., a twenty degree rotation, to the first training data 110a. The training system 102 can determine a changed background for the first training data 110a to apply to the rotated first training data 110a. The training system 102 can determine an amount of occlusion 108b for the rotated first training data 110a. The result of the rotation, changed background, and occlusion 108b is the first transformed training data 112a.

The training system 102 can change any appropriate amount of background content for a changed background transformation. For instance, the training system 102 can change at least a threshold amount of background content for the changed background transformation. The training system 102 can determine the threshold amount using a bounding box that surrounds the object, e.g., the trilobite fossil. The training system 102 can use the bounding box to change the background content that surrounds the bounding box, add additional content, e.g., a greater number of pixels, as background content surrounding the bounding box, or both. In some examples, the training system 102 can change substantially all of the background content for a changed background transformation.

The training system 102 can use the transformed training data 112, potentially along with the training data 110, to train the machine learning model 104 to detect objects depicted in images of the geographic region. The training system 102 can use any appropriate process to train the machine learning model 104.

In some examples, the training system 102 can use a first portion of the transformed training data 112 to train the machine learning model 104 and a second, different portion of the transformed training data 112 to determine whether an accuracy of the machine learning model 104 satisfies a threshold accuracy. When the accuracy satisfies the threshold accuracy, the training system 102 can determine to stop training the machine learning model 104. When the accuracy does not satisfy the threshold accuracy, the training system 102 can continue training the machine learning model 104, e.g., perform more training iterations.

The machine learning model 104 can be any appropriate type of machine learning model. For instance, the machine learning model 104 can be a neural network. The machine learning model 104 can be a convolutional neural network, e.g., a regional convolution neural network. The machine learning model 104 can be a residual neural network ("ResNet"), e.g., a ResNet-fine-tuned localization model. The machine learning model 104 can have custom orientation, alpha, scaling, or a combination of two or more of these, e.g., as a result of the transformations 108 applied to the training data 110 to create the transformed training data 112.

By training the machine learning model 104 with the transformed training data 112, the machine learning model 104 can have a loss of 0.007 over 170,000 training iterations. The machine learning model 104 can have a p-value of approximately $2.25336 \times 10^{-15}$. With unobstructed images, the machine learning model 104 can have a 95% accuracy for general-classification, a 91% accuracy for localization, or both.

After training the machine learning model 104, the training system 102 can provide the machine learning model to another system. The other system can be any appropriate type of system, such as a camera 114, e.g., that can be part of a drone, or an image analysis system 116.

The camera 114 can capture images of areas within the geographic region. The camera 114 can provide the images as input to the machine learning model 104, e.g., the local copy of the machine learning model 104. The camera 114 can receive, as output from the machine learning model 104, data that indicates whether a respective image likely depicts an object, such as a fossil, for which the machine learning model 104 was trained to detect. For instance, when the camera 114 is part of an aerial drone, the camera 114 can capture aerial images of an area within the geographic region and provide data for the images to the machine learning model 104 to cause the machine learning model 104 to determine a likelihood that the area over which the drone passed includes any of the objects, e.g., fossils, for which the machine learning model 104 was trained.

The camera 114, or another system, can provide the likelihood that the area over which the drone passed for presentation, e.g., to a user. For instance, when the camera 114 includes a display, a microphone, or both, the camera 114 can present the likelihood using the display, the microphone, or both. In some implementations, the camera 114 can provide the likelihood to another device to cause the other device to present the likelihood.

In some examples, the image analysis system 116, separate from the camera 114, receives a copy of the machine learning model 104a. The image analysis system 116 can receive images, or data representing images, e.g., from the camera 114 or another device or system. The image analysis system 116 can provide data for the images to the machine learning model 104a. In response, the image analysis system 116 can receive, from the machine learning model 104a, data that indicates a likelihood that a respective image depicts any of the objects, e.g., fossils, for which the machine learning model 104a was trained. The image analysis system 116 can then cause presentation of the likelihood, e.g., on a display connected to the image analysis system 116 or another system.

By including the machine learning model 104a in the image analysis system 116, separate from the camera 114, the image analysis system 116 can perform tasks that require more computational resources using the machine learning model 104a while the camera 114 captures images of areas in the geographic region for which the machine learning model 104a was trained. This can enable the image analysis system 116 to receive images from the camera 114 while increasing the battery life of the camera 114.

The images represented by the training data 110, captured by the camera 114, or both, can be any appropriate type of images. For instance, the images can be visible spectrum images.

In some implementations, the training system 102 can apply the transformations 108 using timing information. For instance, the training system 102 can use timing information for the properties 106 to determine a quantity of corresponding transformations 108 to apply to the training data 110. When the training system 102 determines that first timing information for a first property indicates that the first property occurs in the geographic region a first amount, e.g., during dawn and dusk, and second timing information for a second property indicates that the second property occurs in the geographic region a second amount, e.g., during midday, that is greater than the first amount, the training system 102 can apply more transformations 108 using the second property than the first property.

When applying one or more transformations 108 for a property, the training system 102 can apply a single transformation using the property to a larger amount of the training data 110, apply a greater variety of transformations using the property, potentially in combination with other properties, or a combination of both, compared to the transformations used for another property. For example, the training system 102 can determine two different transformations using the second property and only a single transformation using the first property that occurs less frequently in the geographic region.

In some implementations, the training system 102 might normally apply default pre-processing to training data before the training data is used to train a machine learning model. For instance, a TensorFlow or PyTorch training system might normally apply default pre-processing to image training data, e.g., that reduces a quality of the image training data, before using the image training data to train a machine learning model. In these implementations, the training system 102 can be configured to skip applying default pre-processing of the training data 110, to maintain a quality of the training data 110, or both, to improve an accuracy of the machine learning model 104. For example, the training system 102 can receive input from a user that disables, or automatically determine to disable, default pre-processing of the training data 110. The training system 102 can make this automatic determination in response to determining that the training data 110 includes data that represents images. During the training process, the training system 102 can then determine, using data that indicates disabling of the default pre-processing, to skip default pre-processing of the training data 110. The training system 102 can then create the transformed training data 112 by applying the transformations 108 to the unmodified training data 110.

Although the examples described above describe training the machine learning model 104 to detect fossils, or types of fossils, e.g., invertebrate fossils, the machine learning model 104 can be trained to detect any appropriate type of objects, e.g., using the geographic region properties 106, other appropriate properties, or both. For instance, the training system 102 can train the machine learning model 104 to detect particular types of animals, particular types of invertebrate fossils, or both.

In some implementations, the training system 102 can train the machine learning model 104 using the transformations 108 without the geographic region properties. In these implementations, the training system 102 can use other properties to determine the transformations 108. The other properties need not be specific to a geographic region, and instead can be specific to a type of change included at least a threshold amount in images that depict the type of object for which the machine learning model 104 is being trained. For instance, the properties can indicate any combination of one or more light levels, one or more contrasts, or one or more sunlight incidence angles.

The training system 102 is an example of a system implemented as computer programs on one or more computers in one or more locations, in which the systems, components, and techniques described in this specification are implemented. The training system 102 can use a single server computer or multiple server computers operating in conjunction with one another, including, for example, a set of remote computers deployed as a cloud computing service.

The training system 102 can provide the machine learning model 104 to the camera 114, the image analysis system 116, or both, using a network. The network (not shown), such as a local area network ("LAN"), wide area network ("WAN"), the Internet, or a combination thereof, connects the training system 102, the camera 114, and the image analysis system 116. In some examples, the training system 102 can provide the machine learning model 104 to the camera 114, the image analysis system 116, or both, through a physical, e.g., wired, connection.

The training system 102, the image analysis system 116, or both, can include several different functional components, including the machine learning model 104, 104*a*; a transformation generation component, e.g., that generates the transformations 108, creates the transformed training data 112, or both; or both. The machine learning model 104, 104*a*, the transformation generation component, or a combination of these, can include one or more data processing apparatuses. For instance, each of the machine learning model 104, 104*a* and the transformation generation system can include one or more data processors and instructions that cause the one or more data processors to perform the operations discussed herein.

Figure 2:
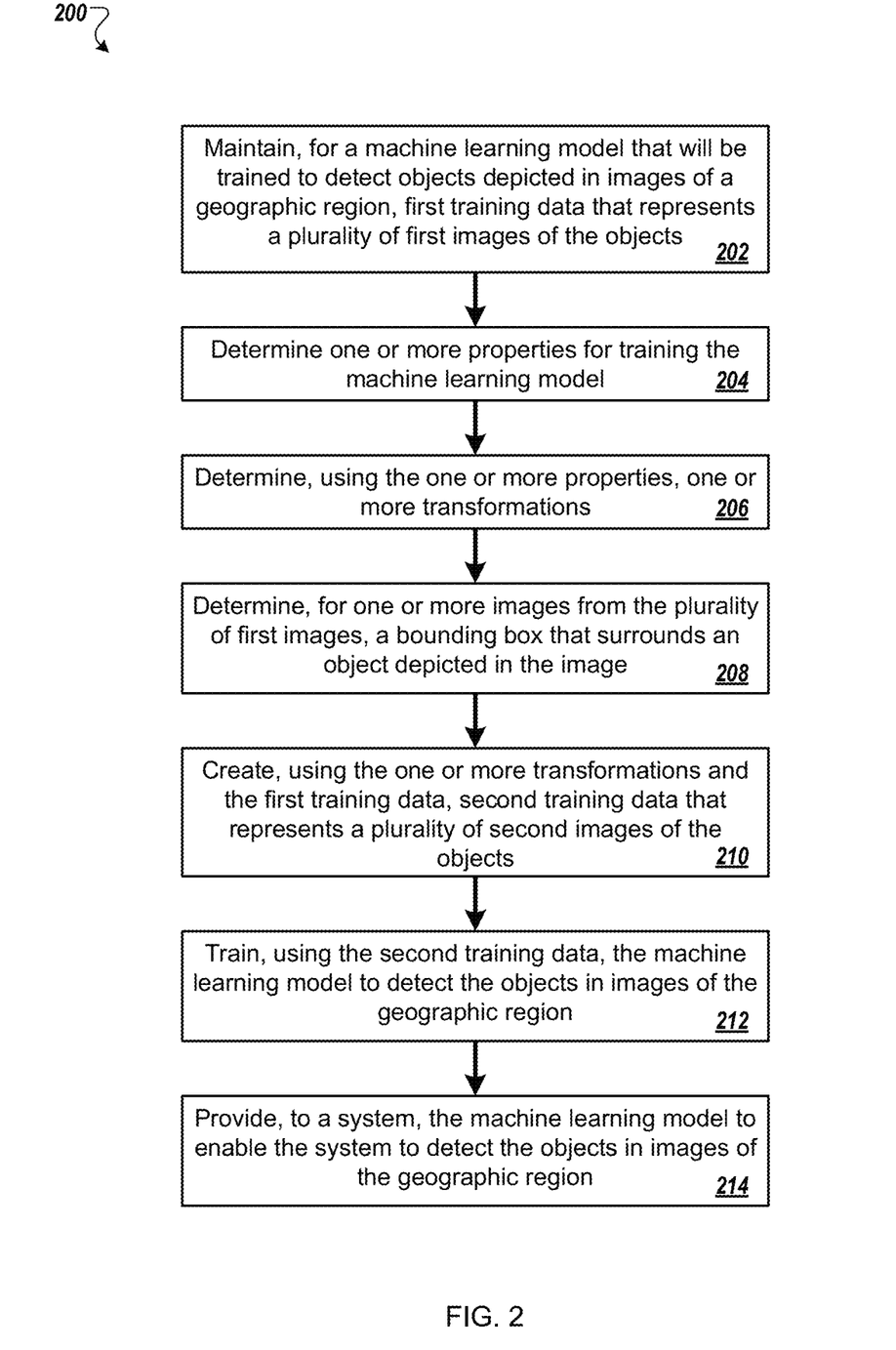
FIG. 2 is a flow diagram of an example process for training a machine learning model to detect objects depicted in images.

FIG. 2 is a flow diagram of an example process 200 for training a machine learning model to detect objects depicted in images. For example, the process 200 can be used by the training system 102 from the environment 100.

A training system maintains, for a machine learning model that will be trained to detect objects depicted in images of a geographic region, first training data that represents a plurality of first images of the objects (202). The training system can maintain the first training data in memory. The training system can maintain, as the first training data, the plurality of first images. The training system can maintain, as the first training data, vectors or other data that represent the plurality of first images.

The objects depicted in the first images can each have a type. The type can be a type for which the machine learning model is being trained, e.g., as a positive example. One example of an object type is a fossil, e.g., an invertebrate fossil. The type can be a type for which the machine learning model is not being trained, e.g., as a negative example.

The training system determines one or more properties for training the machine learning model (204). The properties can be any appropriate properties. For instance, the properties can indicate an amount of object obfuscation, object translation, object rotation, background change, or a combination of two or more of these.

In some examples, at least some of the properties can be geographic properties. The training system can determine any appropriate geographic properties for the geographic region. For instance, the training system can determine a color range, a maximum color wavelength, a minimum color wavelength, a frequency with which one or more colors occur, or a combination of these, for the geographic region. In some examples, the training system can determine, using the color range for the geographic region, the one or more properties for a changed background transformation that indicate one or more changes in color scale for a background portion of an image. Some examples of a color range can include a color histogram, color density estimation data, color data binning, or another appropriate color range.

The training system determines, using the one or more properties, one or more transformations (206). For example, the training system can determine one or more color transformations to apply to at least some of the first training data. The training system can determine a transformation that is any appropriate combination of the transformations described in this specification. When the training system determines the one or more geographic properties, the training system can determine the one or more transformations using the one or more geographic properties.

The training system can determine an amount of the first training data to which to apply the one or more transformations. For instance, the training system can determine to perform one or more transformations on all of the first training data. In some examples, the training system can determine to perform one or more transformations on a subset of the first training data. The training system can determine the amount using timing information, e.g., as described in more detail above, frequency information, or both.

When the one or more transformations include color transformations, the training system can determine a size of the training data subset to which to apply a transformation using an approximate frequency with which the corresponding colors occur in the geographic region. For instance, the training system can determine, using images of areas included in the geographic region, an approximate frequency with which each of multiple colors in a color range occurs. The training system can determine a size of a subset of the first training data to which to apply a corresponding color transformation using the approximate frequency of the corresponding color. For instance, if the frequency indicates that a color occurs in five percent of the pixels of the images of the areas included in the geographic region, the training system can determine to apply a color transformation for the color to approximately five percent of the first training data.

In some examples, the training system can determine a pixel group translation as one of the one or more transformations. The pixel group can be any appropriate group of pixels depicted in an image. For instance, the pixel group can represent an object, e.g., positive or negative, depicted in an image. The pixel group translation can be a horizontal movement, a vertical movement, or a combination of both, of the pixels in the pixel group. Although this example is described with reference to a group of pixels, the training system can determine a translation of any portion of an image or data that represents a portion of an image.

In some examples, the training system can determine a pixel group two-dimensional rotation as one of the one or more transformations. The two-dimensional rotation can be around a z-axis extending out from an image, e.g., when the sides of the image are defined by an x-axis and a y-axis. The z-axis can be a central axis, e.g., in the center of an object being transformed. The z-axis can be in another appropriate location with respect to the object, the image, or both, e.g., in the left half or the right half of the object.

In some examples, the training system can determine a transformation that changes background content as one of the one or more transformations. For instance, the training system can use a transformation to transpose an object depicted in one of the first images to a different background from the background included in the one of the first images. The background can be of a different color, depict different objects, or a combination of both, compared to the one of the first images. The training system can determine to transpose an object not depicted in an image onto a background portion of the image. For example, the training system can determine to transpose a negative example onto an image that depicts a positive example. The training system can determine to partially obfuscate the positive example with the negative example.

In some examples, the training system can determine a transformation that obfuscates an object as one of the one or more transformations. The object can be an object of the type for which the machine learning model is being trained to detect, e.g., a positive example. The object can be of a type for which the machine learning model is not being trained to detect, e.g., a negative example.

The training system can use any appropriate amount of obfuscation. For instance, the training system can randomly determine an amount of obfuscation for a transformation. This can enable the training system to use different amounts of obfuscation for different transformations. In some examples, the training system can determine an amount of obfuscation using a setting. The training system can receive input from a user that defines a value for the setting.

The training system determines, for one or more images from the plurality of first images, a bounding box that surrounds an object depicted in the image (208). For instance, the training system can determine, for one or more images in the plurality of first images, a bounding box that surrounds an object depicted in the image. In some examples, the training system can determine a bounding box that surrounds an object depicted in each image in the plurality of first images. When some images in the plurality of first images depict only negative examples, e.g., for which the machine learning model will not be trained to detect, the bounding box can be of an object that is a negative example. When some images in the plurality of images depict multiple objects, e.g., either positive examples or negative examples or both, the training system can determine, for those images, a single bounding box for one object or multiple bounding boxes. Each of the multiple bounding boxes can be for a respective object depicted in a corresponding image.

The training system creates, using the one or more transformations and the first training data, second training data that represents a plurality of second images of the objects (210). By using the one or more transformations to create the second training data, the training system can create a more robust training data set that can improve an accuracy of the machine learning model, e.g., during runtime analysis.

In some examples, the training system can use data for the bounding boxes to create the second training data. For instance, the training system can apply at least some transformations from the one or more transformations to objects represented by bounding boxes. In these examples, the training system can apply a rotation, a changed background, object obfuscation, a color scale change, or a combination of two or more of these, to an object surrounded by a corresponding bounding box. In some examples, the training system can apply at least some transformations from the one or more transformations to content outside of a bounding box for a respective first image from the plurality of first images.

In some implementations, the training system can create at least some of the second training data without using the bounding boxes. For example, the training system can apply a color scale change, using a corresponding transformation, to an entire image, e.g., without using a bounding box for the image.

In some implementations, the training system can create, using a portion of the first training data that represents a first image, a corresponding portion of the second training data that represents at least one second image with a background that is transformed using the one or more changes in color scale applied to the first image from the first training data. For instance, as part of a background change transformation, the training system can change, for a first image from the plurality of first images, the color scale of background content depicted in the first image to create a corresponding second image in the plurality of second images. The training system can apply a single color scale transformation to all background content. The training system can apply different color scale transformations to different portions of the background content.

The training system can use multiple transformations of a single type, transformations that include combinations of the different types of transformations described in this specification, or both. For instance, the training system can use multiple different transformations of a single type, e.g., color transformations, for a single set of the first training data, e.g., for a first image in the first training data. The training system can apply a first color transformation to the first image to create a first portion of the second training data and apply a second, different color transformation to the first image to create a second, different portion of the second training data.

In some implementations, the training system can create a second image by applying two or more transformations to a corresponding first image. For instance, the training system can use a bounding box to determine first content depicted in the first image that is likely background content and second content depicted in the first image that is likely an object. The training system can select a first transformation from the two or more transformations to apply to the first content that is likely background content. The training system can select a second transformation from the two or more transformations to apply to the second content that is likely an object, e.g., whether a positive example or a negative example. The training system can then apply the two or more transformations to the first image to create the corresponding second image for the second training data. The training system can apply two or more transformations to data for an entire image.

In some implementations, the training system can create a second image using two first images. For instance, the training system can determine first content depicted in one of the first images and second content depicted in the other of the first images. The training system can then apply one or more transformations to the first content, the second content, or both, to create the second image. Specifically, the training system can detect a first object depicted in the first image and a second object depicted in the second image. The training system can apply one transformation to the first object and another transformation to the second object. The training system can then create the second image that includes data representing at least the transformed first object and the transformed second object. In some examples, the training system can use the first object to transform, e.g., obfuscate, the second object.

The training system trains, using the second training data, the machine learning model to detect the objects in images of the geographic region (212). For example, the training system provides data from the second training data to the machine learning model as input. The training system can provide some or all of the first training data to the machine learning model as part of the training process.

The training system receives output from the machine learning model and updates one or more parameters, e.g., weights, of the machine learning model given an accuracy of the output. The training system can use any appropriate process to train the machine learning model to detect the objects, e.g., fossils. The training system can train the machine learning model to detect invertebrate fossils. In some examples, the training system can train the machine learning model to detect vertebrate fossils.

The training system provides, to another system, the machine learning model to enable the system to detect the objects in images of the geographic region (214). The other system can be any appropriate type of system, such as a camera or an image analysis system. As discussed above, the objects can be invertebrate fossils.

The order of steps in the process 200 described above is illustrative only, and training the machine learning model to detect objects depicted in images can be performed in different orders. For example, the training system can determining a bounding box that surrounds an object and then determine the one or more properties. In some examples, the training system can perform steps 204 and 208 substantially concurrently. For instance, the training system can determine the one or more properties and then, substantially concurrently, i) determine a bounding box for an object depicted in an image and ii) determine a transformation for the object using the content included in the bounding box, e.g., a changed background.

In some implementations, the process 200 can include additional steps, fewer steps, or some of the steps can be divided into multiple steps. For example, the training system can perform steps 204, 206, and 210 without performing the other steps in the process 200. In some examples, the training system can perform steps 204, 206, 210, 212, and 214 without performing the other steps in the process 200. In some implementations, the training system can perform steps 206, 210, and 212 without performing the other steps in the process 200.

In some implementations, the training system can use data that represents two-dimensional images. For instance, images in the plurality of first images, represented by the first training data, can be two-dimensional images. The images in the plurality of second images, represented by the second training data, can be two-dimensional images.

In some implementations, the training system can determine the one or more transformations using configuration data. The configuration data can be for the training system, e.g., identified in user input. In some examples, the configuration data can specify properties, e.g., non-geographic properties, for the geographic region. For instance, the training system can determine an amount of rotation, translation, or both, using the configuration data. The training system can determine the amount of rotation, translation, or both, using a size of the first training data, a size of the geographic region, or both. The training system can determine an amount of variation for rotation, translation, or both, in the transformations using a size of the first training data, a size of the geographic region, or both.

In some implementations, the training system can determine a number of transformations, a size of the second training data, or both. For instance, the training system can determine a number of the transformations to apply to the first training data using a size of the first training data. When the training system trains the machine learning model using both the first training data and the second training data, the training system can determine a size of the second training data using at least the size of the first training data.

In some implementations, the training system can perform one or more steps in the process 200 multiple times. For instance, the training system can perform steps 204, 206, 210, and 212 for a first geographic region. The training system can perform steps 204, 206, 210, and 212 for a second, different geographic region. The training system can perform some of the steps for the first geographic region and the second, different geographic region substantially concurrently. The training system can perform some of the steps for the first geographic region and the second, different geographic region at different times.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
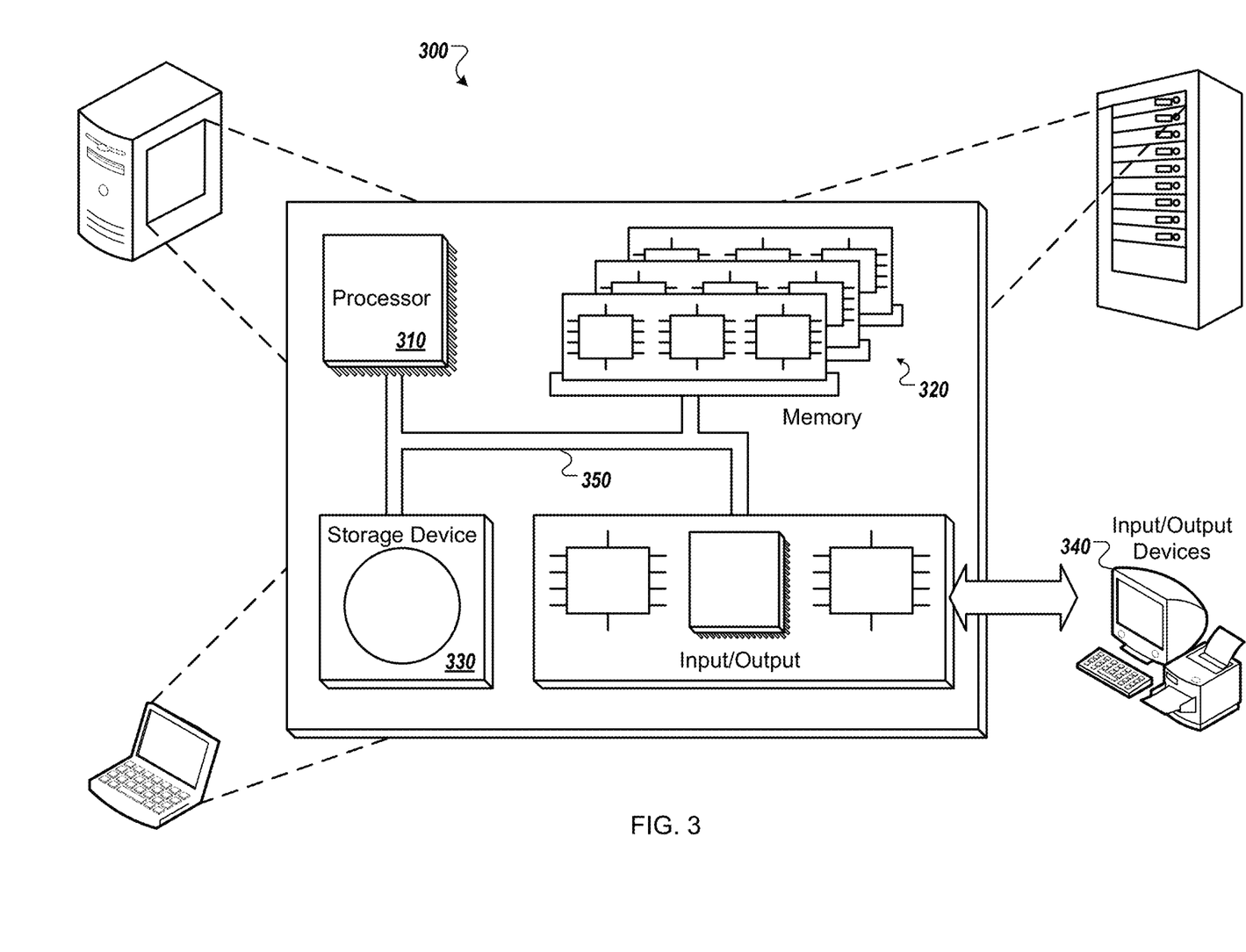
FIG. 3 is a block diagram of a computing system that can be used in connection with computer-implemented methods described in this specification.

An example of one such type of computer is shown in FIG. 3, which shows a schematic diagram of a computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   maintaining, for a machine learning model that will be trained to detect invertebrate fossils depicted in images of a geographic region, first training data that represents at least a plurality of first images of invertebrate fossils;
   determining, based on two or more of a plurality of geographic properties of the geographic region, a plurality of transformations, the plurality of transformations comprising at least one of each of:
      a changed background that changes at least some background content from content for an input image from the plurality of first images to different background content for an output image from a plurality of second images, and
      an object obfuscation that at least partially obfuscates an object for an input image from the plurality of first images to have a different representation in an output image from the plurality of second images, the determining comprising:
      determining, based on the one or more geographic properties of the geographic region, one or more objects whose occurrence in the geographic region satisfies an occurrence threshold;
      determining, based on data for the one or more objects whose occurrence in the geographic region satisfies the occurrence threshold, to perform at least one object obfuscation; and
      determining, based on a color range from the plurality of geographic properties for the geographic region or the objects whose occurrence in the geographic region satisfies the occurrence threshold, one or more properties for a changed background transformation;
   creating second training data that represents the plurality of second images of invertebrate fossils by applying, for each of the one or more transformations and to training data from the first training data for a first image from the plurality of first images, the respective transformation;
   training, by providing the second training data as input to the machine learning model, the machine learning model to detect invertebrate fossils in images of the geographic region; and
   providing, to a system, the trained machine learning model to enable the system to detect invertebrate fossils in images of the geographic region.

2. The method of claim 1, wherein creating the second training data comprises creating the second training data that represents at least one second image from the plurality of second images and in which one of the one or more objects partially obfuscates an invertebrate fossil.

3. The method of claim 1, wherein determining the one or more transformations comprises determining, based on the color range for the geographic region, the changed background transformation.

4. The method of claim 3, wherein determining the one or more properties for the changed background transformation comprises selecting data that represents an image of the geographic region.

5. The method of claim 4, wherein the image of the geographic region does not depict an invertebrate fossil.

6. The method of claim 1, wherein creating the second training data comprises creating the second training data that represents at least one second image from the plurality of second images and in which an invertebrate fossil is transposed onto the image of the geographic region.

7. The method of claim 1, comprising:
   determining, for each of a plurality of colors in the color range, a frequency with which the respective color occurs in one or more images of the geographic region, wherein:
   the second training data represents a first quantity of second images; and
   creating the second training data comprises creating, based on the one or more transformations and the first training data, the second training data that includes, for each color in the plurality of colors, a respective second quantity of the second images, a ratio of the respective second quantity to the first quantity being approximately the same as the frequency with which the respective color occurs in the one or more images of the geographic region.

8. The method of claim 1, comprising:
   determining, for one or more images from the plurality of first images represented by the first training data, a bounding box that surrounds an object depicted in the image, wherein:
   creating the second training data comprises creating, based on the one or more transformations and a subset of the first training data that represents respective portions of the images included in the bounding boxes, the second training data that represents a second image of the object and is from the plurality of second images.

9. The method of claim 1, wherein training the machine learning model comprises training, based on the second training data, a convolutional neural network to detect invertebrate fossils depicted in images of the geographic region.

10. The method of claim 1, wherein training the machine learning model comprises training, based on the second training data, a residual neural network to detect invertebrate fossils depicted in images of the geographic region.

11. The method of claim 1, wherein:
maintaining the first training data comprises maintaining, for the machine learning model that will be trained to detect invertebrate fossils depicted in images of the geographic region based on aerial images, the first training data that represents at least the plurality of first images of invertebrate fossils; and
providing, to the system, the machine learning model to enable the system to detect invertebrate fossils in aerial images of the geographic region.

12. The method of claim 1, wherein:
the first training data represents a) the plurality of first images of invertebrate fossils and b) a plurality of third images of negative objects that are not invertebrate fossils; and
the second training data represents i) the plurality of second images of invertebrate fossils and ii) a plurality of fourth images of negative objects that are not invertebrate fossils.

13. The method of claim 1, comprising:
for a second, different geographic region that has at least one second geographic property that is different than the plurality of geographic properties of the geographic region:
determining, based on one or more second geographic properties of the second, different geographic region, one or more second transformations;
creating, based on the one or more second transformations and the first training data, third training data that represents a plurality of third images;
creating a second trained machine learning model by training, based on the third training data, the machine learning model to detect invertebrate fossils depicted in second images of the second, different geographic region; and
providing, to another system, the second trained machine learning model to enable the other system to detect invertebrate fossils depicted in second images of the second, different geographic region.

14. The method of claim 13, wherein:
the third images depict invertebrate fossils.

15. A system comprising one or more computers and one or more storage devices on which are stored instructions that are operable, when executed by the one or more computers, to cause the one or more computers to perform operations comprising:
maintaining, for a machine learning model that will be trained to detect invertebrate fossils depicted in images of a geographic region, first training data that represents at least a plurality of first images of invertebrate fossils;
determining, based on two or more of a plurality of geographic properties of the geographic region, a plurality of transformations, the plurality of transformations comprising at least one of each of:
a changed background that changes at least some background content from content for an input image from the plurality of first images to different background content for an output image from a plurality of second images, and
an object obfuscation that at least partially obfuscates an object for an input image from the plurality of first images to have a different representation in an output image from the plurality of second images, the determining comprising:
determining, based on the one or more geographic properties of the geographic region, one or more objects whose occurrence in the geographic region satisfies an occurrence threshold;
determining, based on data for the one or more objects whose occurrence in the geographic region satisfies the occurrence threshold, to perform at least one object obfuscation; and
determining, based on a color range from the plurality of geographic properties for the geographic region or the objects whose occurrence in the geographic region satisfies the occurrence threshold, one or more properties for a changed background transformation;
creating second training data that represents the plurality of second images of invertebrate fossils by applying, for each of the one or more transformations and to training data from the first training data for a first image from the plurality of first images, the respective transformation;
training, by providing the second training data as input to the machine learning model, the machine learning model to detect invertebrate fossils in images of the geographic region; and
providing, to another system, the trained machine learning model to enable the other system to detect invertebrate fossils in images of the geographic region.

16. One or more non-transitory computer storage media encoded with instructions that, when executed by one or more computers, cause the one or more computers to perform operations comprising:
maintaining, by a training system that includes the one or more computers and for a machine learning model that will be trained to detect invertebrate fossils depicted in images of a geographic region, first training data that represents at least a plurality of first images of invertebrate fossils;
determining, by the training system and based on two or more of a plurality of geographic properties of the geographic region, a plurality of transformations, the plurality of transformations comprising at least one of each of:
a changed background that changes at least some background content from content for an input image from the plurality of first images to different background content for an output image from a plurality of second images, and
an object obfuscation that at least partially obfuscates an object for an input image from the plurality of first images to have a different representation in an output image from the plurality of second images, the determining comprising:
determining, based on the one or more geographic properties of the geographic region, one or more objects whose occurrence in the geographic region satisfies an occurrence threshold;
determining, based on data for the one or more objects whose occurrence in the geographic region satisfies the occurrence threshold, to perform at least one object obfuscation; and
determining, based on a color range from the plurality of geographic properties for the geographic region or the objects whose occurrence in the geographic region satisfies the occurrence threshold, one or more properties for a changed background transformation;
creating, by the training system, second training data that represents the plurality of second images of invertebrate fossils by applying, for each of the one or more transformations and to training data from the first training data for a first image from the plurality of first images, the respective transformation;

training, by the training system that provides the second training data as input to the machine learning model, the machine learning model to detect invertebrate fossils in images of the geographic region; and providing, by the training system and to a second system, the trained machine learning model to enable the system to detect invertebrate fossils in images of the geographic region.

17. The computer storage media of claim 16, wherein determining the one or more properties for the changed background transformation comprises determining, based on the objects whose occurrence in the geographic region satisfies the occurrence threshold, the changed background transformation that transposes an object from one background in a second input image from the plurality of first images to another background in the output image from the plurality of second images.

18. The computer storage media of claim 16, wherein determining the one or more properties for the changed background transformation comprises determining, based on the color range for the geographic region, a color scale for the changed background transformation.

19. The computer storage media of claim 16, the operations comprising:

determining, for one or more images from the plurality of first images represented by the first training data, a bounding box that surrounds an object depicted in the image, wherein:

creating the second training data comprises creating, based on the one or more transformations and a subset of the first training data that represents respective portions of the images included in the bounding boxes, the second training data that represents a second image of the object and is from the plurality of second images.

20. The system of claim 15, the operations comprising:

determining, for one or more images from the plurality of first images represented by the first training data, a bounding box that surrounds an object depicted in the image, wherein:

creating the second training data comprises creating, based on the one or more transformations and a subset of the first training data that represents respective portions of the images included in the bounding boxes, the second training data that represents a second image of the object and is from the plurality of second images.

* * * * *